June 4, 1968            T. H. REA            3,386,659
HUMIDIFIERS OF THE STEAM DISCHARGE TYPE
Filed Sept. 24, 1965            3 Sheets-Sheet 2
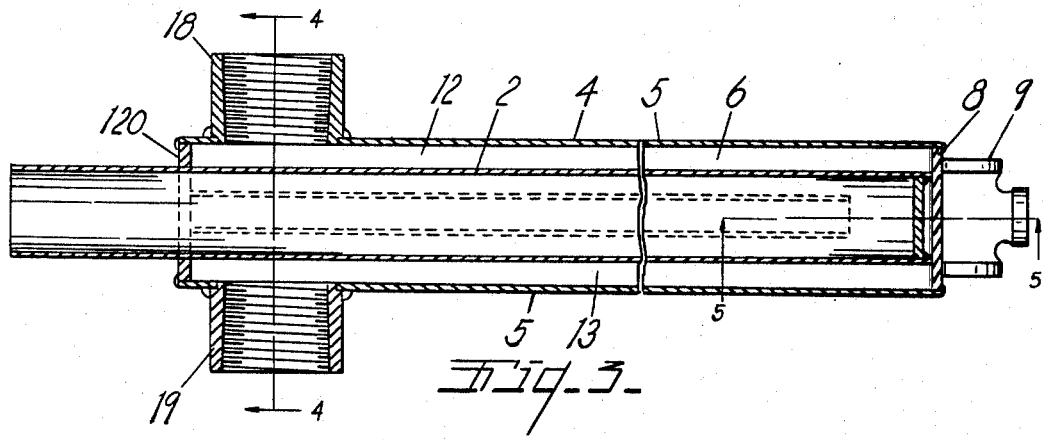
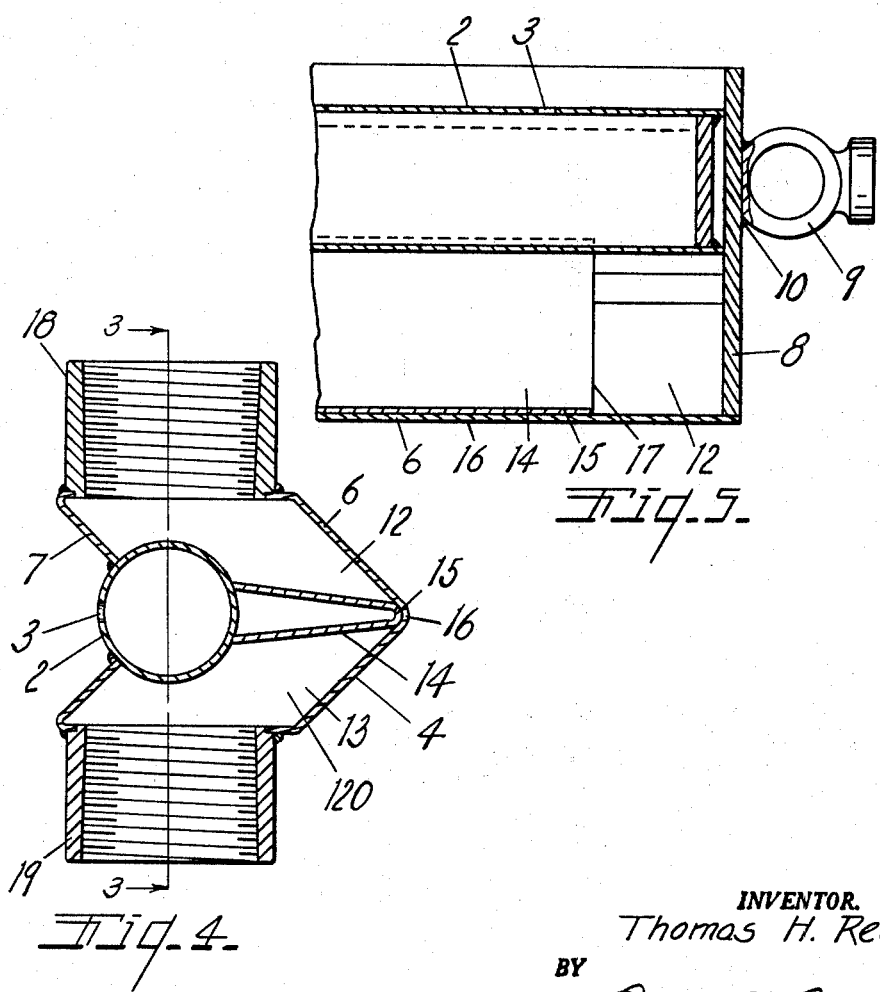
INVENTOR.
Thomas H. Rea
BY
ATTORNEY.

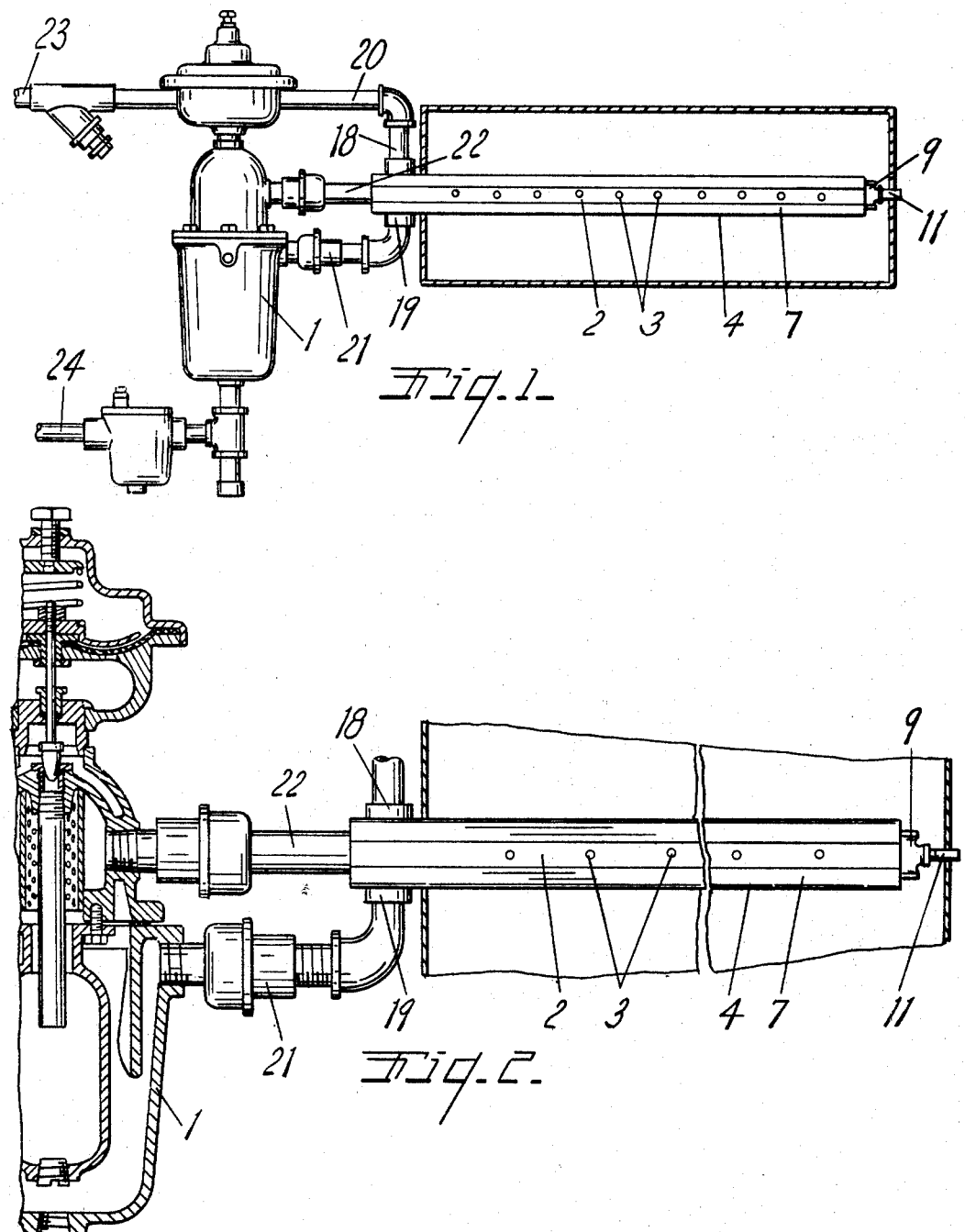

June 4, 1968   T. H. REA   3,386,659
HUMIDIFIERS OF THE STEAM DISCHARGE TYPE
Filed Sept. 24, 1965   3 Sheets-Sheet 3

INVENTOR.
THOMAS H. REA
BY
Woodhams, Blanchard & Flynn
ATTORNEYS

# United States Patent Office 3,386,659
Patented June 4, 1968

3,386,659
HUMIDIFIERS OF THE STEAM DISCHARGE TYPE
Thomas H. Rea, Three Rivers, Mich., assignor to Armstrong Machine Works, Three Rivers, Mich.
Continuation-in-part of applications Ser. No. 384,287, July 17, 1964, and Ser. No. 130,966, Aug. 11, 1961.
This application Sept. 24, 1965, Ser. No. 496,234
17 Claims. (Cl. 239—132)

ABSTRACT OF THE DISCLOSURE

A humidifier for discharging dry steam in a duct comprising an elongated steam discharge conduit having a plurality of spaced discharge orifices along at least one side thereof. Elongated second conduit means extends lengthwise along the steam discharge conduit in heat transfer relationship therewith so that the steam discharge conduit can be heated by steam flowing the second conduit means. The second conduit means covers only a portion of the periphery of the steam discharge conduit and the discharge orifices are located in the uncovered portion of the steam discharge conduit so that a continuous lengthwise extending portion of the periphery of the steam discharge conduit including the discharge orifices is uncovered and exposed.

---

This application is a continuation-in-part of my copending application Ser. No. 384,287, filed July 17, 1964, now abandoned, which in turn is a continuation of my earlier application Ser. No. 130,966, filed Aug. 11, 1961, now abandoned.

This invention relates to apparatus for humidifying air and, more particularly, relates to a humidifier for discharging dry steam in a duct through which air flows.

It is well known that it is desirable to maintain a controlled humidity in buildings. For example, in wintertime dry air is uncomfortable to many people and is said to increase the suspectibility of human beings to colds and respiratory illnesses. Also, dry air permits the accumulation of static electricity charges on production machinery, office machines and people, which creates production problems, personal discomfort and, under some conditions, explosion hazards. Also, hygroscopic materials, such as wood, paper, textile fibers, leather, etc. give up moisture to dry air which can cause deterioration of materials and/or serious production problems.

Various types of humidifying apparatuses have been suggested heretofore, but these have not been completely satisfactory in all respects. Most of these involve supplying water in the form of droplets or mist and this causes a variety of problems. The use of dry steam for humidification purposes solves many of these problems. As used herein, the term "dry steam" refers to steam in a purely vapor phase condition, that is, steam from which water droplets and mist have been removed. Dry steam is absorbed immediately by air and is pure water vapor so that there is no mineral dust created, such as occurs when water is evaporated by a moving air stream. The quantity of dry steam supplied and the time during which it is supplied can be closely controlled by suitable automatic controls. Further, dry steam creates no sanitation or odor problems because the duct system and the air handling units are always dry. Dry steam will not encourage the growth of algae or bacteria. Also, dry steam creates no corrosion problems in ducts and fan housings. Moreover, dry steam is economical.

It is difficult to assure the discharge of dry steam into a duct. The high velocity air flowing through the duct ordinarily is at a temperature well below the boiling point of water and, therefore, cools the steam in the steam discharge pipe and causes condensation thereof. Thus, drops of water are discharged from the pipe with the steam and collect in the duct and cause corrosion problems and create conditions favorable to the growth of bacteria. The present invention is directed to an improved steam discharge manifold construction for assuring the discharge of dry steam in a duct.

The main objects of this invention include:

(1) To provide a humidifier for discharging dry steam in a duct in which in normal operation there is no condensation in the steam discharge conduit.

(2) To provide a humidifier for discharging dry steam in a duct, as aforesaid, in which any water drops which may be contained in the steam entering the humidifier from the supply source are evaporated.

(3) To provide a humidifier, as aforesaid, which constitutes an assembled unit and is adapted to be installed as such.

(4) To provide a humidifier, as aforesaid, which may be installed in various relations in order to meet particular use conditions, as for example in vertical or horizontal ducts, or positioned to discharge dry steam to meet varying use requirements.

Other objects and advantages of the invention will become apparent to persons acquainted with equipment of this type upon reading the following disclosure and inspecting the accompanying drawings, in which:

FIGURE 1 is a side elevational view of the humidifier positioned in a horizontally disposed duct, the duct being shown in cross section.

FIGURE 2 is a fragmentary elevational view with the control valve shown in cross section.

FIGURE 3 is a longitudinal sectional view taken along the line 3—3 of FIGURE 4.

FIGURE 4 is an enlarged transverse section taken along the line 4—4 of FIG. 3.

FIGURE 5 is an enlarged fragmentary view taken along the line 5—5 of FIGURE 3.

Figure 6:
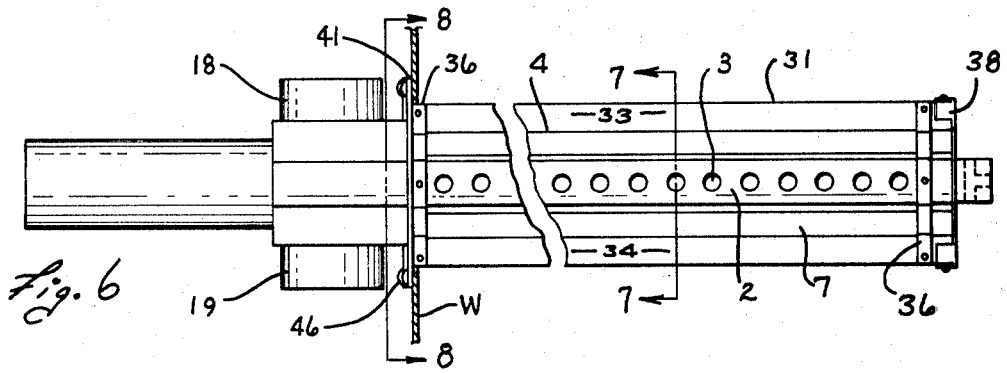

FIGURE 6 corresponds to a fragment of FIGURE 2 and shows a modified humidifier construction and also shows the use of an escutcheon structure for mounting the humidifier on the duct.

Figure 7:
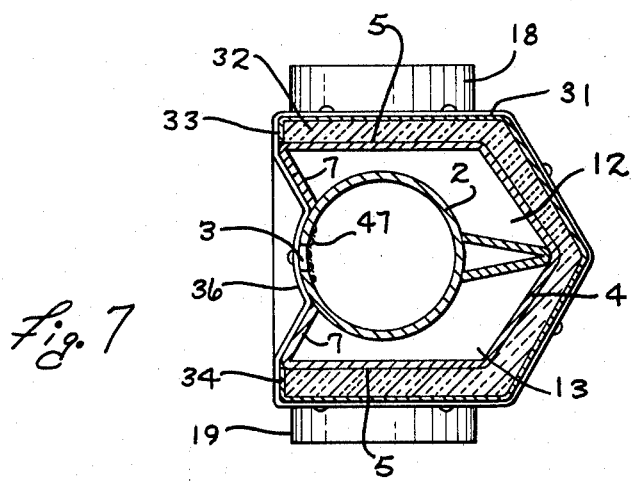

FIGURE 7 is a sectional view taken along the line 7—7 of FIGURE 6.

Figure 8:
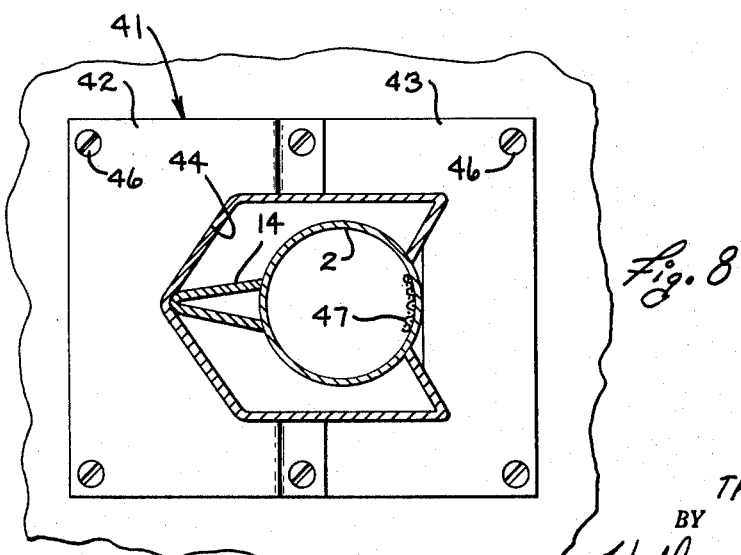

FIGURE 8 is a sectional view taken along the line 8—8 of FIGURE 6.

According to the invention, there is provided a humidifier for discharging dry steam in a duct which comprises an elongated steam discharge conduit which is closed at one end and has a plurality of spaced discharge openings along one side thereof. An elongated second conduit embraces the discharge conduit except for a relative narrow segment thereof having the discharge openings therein, the second conduit having spaced-apart, opposite, continuous, longitudinal edges affixed to the outer surface of the steam discharge conduit along the entire length thereof on respectively opposite sides of the orifices. End walls close the ends of the second conduit. An imperforate portion of the discharge conduit projects through one end wall and is adapted for connection to a supply of steam. Inlet and outlet couplings are connected to the second conduit and are adapted for connection to a supply of steam so that flow of steam through the space between the two conduits prevents condensation of the steam flowing within the discharge conduit.

*Detailed description*

Referring to FIGURES 1 through 5, there is shown a humidifier which comprises a steam control unit 1 connected to a steam discharge pipe 2 for discharging dry steam in a duct. The structural details of the steam control unit 1 are not described except as to the operating connections of the humidifier thereto. The humidifier illustrated and embodied in the applicant's invention comprises a steam discharge conduit 2 which is provided with a plurality of longitudinally spaced discharge orifices or openings 3, see FIGURES 1 and 2. A second conduit, designated generally by the numeral 4, constitutes a housing for the steam discharge conduit 2 and provides what may be called a temperature maintaining means for the steam within the discharge conduit 2, thereby preventing condensation of the steam within said discharge conduit. This second or housing conduit 4, in the embodiment illustrated, is comprised of parallel side walls 5 spaced from the steam discharge conduit 2 as is illustrated in FIGURE 3, an outer wall 6 which is of inwardly facing angled section, and inwardly converging walls 7, see FIGURE 4.

This second conduit or housing conduit 4 is desirably formed of one piece of sheet stock, the edges of the inner wall 7 being secured to the discharge conduit 2 in laterally spaced relation to and on opposite sides of the discharge orifices 3. The outer end wall 8 is preferably of relatively heavy stock so that the support member 9 may be fixedly secured thereto as indicated at 10, the support member being adapted to receive a supporting or coupling member as indicated at 11 in FIGURES 1 and 2, or a support member arranged transversely of the humidifier unit. The inner end of the discharge conduit 2 projects through the inner end wall 120.

This second conduit or housing member 4 is divided into an inlet passage 12 and an outlet passage 13 by means of the longitudinally extending partition 14, which, in the embodiment illustrated, is of folded stock of generally V-shaped cross section. The bight 15 of the partition 14 is engaged within the apex of the wall 6, the inner arm portions are supportedly engaged and connected to the steam discharge conduit 2, see FIGURE 4. The end 17 of this member 14 is spaced from the end wall 8 so that steam may flow around the end of the partition as is indicated in FIGURE 5. At its inner end, the second or housing conduit 4 is provided with an inlet coupling 18 and an outlet coupling 19, the inlet coupling being connected to the source of steam indicated generally by the numeral 20 in FIGURE 1, and the outlet coupling 19 being connected by the coupling 21 to the steam control unit 1. The steam discharge conduit 2 is connected either directly or by a coupling means 22, to the steam outlet of the control unit 1. The major portion of the wall of the discharge conduit 2 is thus common to the walls of the inlet passage 12 and the outlet passage 13 of the second conduit 4 for direct heat exchange from the second conduit to the steam discharge conduit. As stated, the details of the control unit 1 are not described for the reason that it forms no part of my present invention, except that it provides means for controlling the supply of steam from the supply conduit 23 and a discharge of condensate through the discharge conduit 24. It will be understood that in practice it is desirable to provide a humidity control means for controlling operation of the control unit 1. As stated, the unit is designed to be readily installed to meet varying conditions and requirements.

The steam entering the conduit 4 from the supply conduit 23 preferably is at above atmospheric supply pressure and is at a temperature such that it evaporates any condensate that may be present in the steam discharge conduit 2, whereby the steam discharged through the orifices is in a dry condition. Any condensate that forms in the passages 12 and 13 of the housing conduit 4 flows into the steam control unit 1 and is discharged therefrom. The steam entering the steam discharge conduit 2 preferably is very slightly above atmospheric pressure.

The length of the humidifier unit is such that it substantially spans the maximum dimension of the duct section and said humidifier is preferably installed in the center of the duct. The humidifier unit can be installed in a vertical or horizontal position. When installed in a vertical position, the control unit 1 should be below the duct to avoid condensate drainage problems. The humidifier preferably is installed so that the orifices 3 face upstream of the air flow. The humidifier can be installed in plenums, fan housings and ducts. In the claims, the term "duct" will be used in a broad sense to refer to any enclosure through which air flows under pressure created by suitable means, such as a fan.

*Modification*

Referring to FIGURES 6 through 8, there is illustrated a modified humidifier structure. The steam discharge conduit, the second conduit and the associated parts are the same as those indicated in previously described embodiments of the invention and are indentified by the same reference numerals.

In this embodiment, there is provided an outer casing 31 which extends from adjacent the couplings 18 and 19 to the other end of the humidifier unt. The outer casing 31 is of substantially the same cross-sectional shape as the conduit 4 but is of larger size. The casing 31 surrounds and is spaced from the conduit 4 to provide space therebetween. The space is filled with an insulating material 32 to minimize the radiation of heat from the conduit 4. This humidifier construction would be used, for example, where it is desired to minimize transference of heat from the humidifier to the air flowing therepast through the duct, such as when the duct carries cooled air.

The casing 31 has transverse flanges 33 and 34 which extend to the conduit 4 adjacent the juncture of the walls 5 and the remote edges of the walls 7. Spaced-apart retainers, two of which are indicated at 36, are secured to the conduit 2 and to the casing 31 to secure the casing in place on the humidifier. The casing is closed at its outer end by an end plate 38. The inner end of the casing 31 is closed by having the casing abut against the hereinaftermentioned escutcheon structure 41.

FIGURES 6 through 8 also disclose the use of an escutcheon structure 41 for mounting the humidifier on a duct. The escutcheon structure 41 consists of two plates 42 and 43 whose adjacent edges are overlapped and secured together during installation by sheet metal screws 46. The plates 42 and 43 have cutout portions which mate to define an opening 44 of the same size and shape as the humidifier. In installation, the humidifier is inserted through an opening in the duct wall. Then the two plates 42 and 43 are disposed around the humidifier and are secured to each other and to the duct wall by the sheet metal screws 46.

FIGURES 6 through 8 also disclose the provision of a full length silencing screen 47 which extends across the orifices 3 to prevent whistling of the steam as it flows past the orifices.

While particular preferred embodiments of the invention have been described, the invention contemplates such changes and modifications therein as lie within the scope of the appended claims.

The embodiments of the invention in which an exclusive property or privilege is claimed are defined as follows:

1. A humidifier for discharging dry steam in a duct, comprising:
    an elongated steam discharge conduit, said steam discharge conduit having a plurality of spaced discharge orifices along at least one side thereof and means for supplying steam to said steam discharge conduit;
    elongated second conduit means extending lengthwise along said steam discharge conduit and in heat transfer relationship therewith so that said steam discharge conduit can be heated by steam flowing through said second conduit means;
    means connected to said second conduit means and adapted for connection to a supply of steam so that flow of steam through said second conduit means prevents condensation of the steam flowing through said steam discharge conduit;

said second conduit means covering only a portion of the periphery of said steam discharge conduit and the discharge orifices being located in the uncovered portion of the steam discharge conduit so that a continuous lengthwise extending portion of the periphery of said steam discharge conduit including said discharge orifices is uncovered and exposed.

2. A humidifier for discharging dry steam in a duct, comprising:
an elongated steam discharge conduit, said steam discharge conduit being closed at one end thereof and having a plurality of spaced discharge orifices along at least one side thereof and means for supplying steam to said steam discharge conduit;
elongated second conduit means extending lengthwise along said steam discharge conduit and in heat transfer relationship therewith so that said steam discharge conduit can be heated by steam flowing through said second conduit means;
inlet and outlet couplings connected to said conduit means and adapted for connection to a supply of steam so that flow of steam through said second conduit means prevents condensation of the steam flowing within said steam discharge conduit;
said second conduit means covering only a portion of the periphery of said steam discharge conduit and the discharge orifices being located in the uncovered portion of the steam discharge conduit so that a continuous lengthwise extending portion of the periphery of said steam discharge conduit including said discharge orifices is uncovered and exposed.

3. A humidifier according to claim 2, in which said steam discharge conduit has a uniform cross-sectional shape throughout its length and the outer ends of said orifices terminate at the outer surface of said steam discharge conduit.

4. A humidifier according to claim 2, including a steam control valve adapted to separate condensate from steam, said valve having an inlet connected to said outlet coupling, said valve having a steam outlet connected to the other end of said steam discharge conduit.

5. A humidifier according to claim 2, in which said second conduit means is comprised of wall means enveloping said steam discharge conduit except for a relatively narrow segment thereof having said discharge orifices therein, said wall means being spaced from said steam discharge conduit and having spaced-apart opposite continuous longitudinal edges directly affixed to the outer surface of said steam discharge conduit and in sealing relationship therewith along the entire length thereof on respectively opposite sides of said orifices;
end walls closing the ends of said second conduit means;
said steam discharge conduit having an imperforate portion at the other end thereof projecting through one end wall and adapted for connection to a supply of steam.

6. A humidifier according to claim 2, including the elongated hollow duct through which air can flow, said steam discharge conduit and said second conduit means extending into the exterior of said duct.

7. A humidifier according to claim 5, in which said inlet and outlet couplings are connected to one end of said second conduit means, a transverse partition in said second conduit means dividing same into an inlet passage that communicates with said inlet coupling and an outlet passage that communicates with said outlet coupling, said partition extending from said one end of said second conduit means to a position spaced from said other end of the second conduit means so that said passages are in communication with each other adjacent said other end of said second conduit means.

8. A humidifier according to claim 6, in which said said steam discharge conduit and said second conduit means extend transversely within said duct substantially from one side to the other side thereof and said discharge orifices are spaced apart substantially uniformly across the width of said duct.

9. A humidifier according to claim 6, including means for supporting both ends of steam discharge conduit and said second conduit means on said duct.

10. A humidifier according to claim 6, including a steam control valve positioned outside of said duct, said steam control valve having an inlet and a steam outlet, a first conduit connecting said outlet coupling to said valve inlet, a second conduit connecting said steam outlet to the other end of said steam discharge conduit, and a third conduit connected to said inlet coupling for supplying steam thereto.

11. A humidifier according to claim 6, in which said discharge orifices face upstream of the direction of air flow in said duct.

12. A humidifier according to claim 6, in which said inlet and outlet couplings are connected to one end of said conduit means, a transverse partition in said second conduit means dividing same into an inlet passage that communicates with said inlet coupling and an outlet passage that communicates with said outlet coupling, said partition extending from said one end of said second conduit means to a position spaced from said other end of said second conduit means so that said passages are in communication with each other adjacent said other end of said second conduit means.

13. A humidifier comprising an elongated steam discharge conduit closed at its outer end and provided with a plurality of aligned longitudinally spaced discharge orifices in one side thereof;
a second elongated conduit constituting a housing for the major portion of said steam discharge conduit and comprising side walls disposed on opposite sides of and in laterally spaced relation to said steam discharge conduit, and an outer cross wall of inwardly facing angle section;
inwardly converging inner cross walls extending from the inner edges of said side walls and fixedly connected to said steam discharge conduit on opposite sides of the portion thereof having the said discharge orifices therein;
an end wall for the outer end of said second conduit provided with a support receiving coupling;
an inner end wall for said second conduit and through which said steam discharge conduit projects;
a longitudinal partition for said second conduit extending between said steam discharge conduit and the apex of the second conduit outer cross wall but terminating in spaced relation to the said outer end wall of said second conduit;
and inlet and discharge coupling members fixedly secured to said second conduit side walls adjacent the inner ends thereof and disposed in aligned relation to each other and in angular relation to said steam discharge conduit.

14. A humidifier comprising an elongated steam discharge conduit closed at its outer end and provided with a plurality of longitudinally spaced discharge orifices in one side thereof;
a second elongated conduit constituting a housing for the major portion of said steam discharge conduit and comprising side walls disposed on opposite sides of and in laterally spaced relation to said steam discharge conduit;
an outer cross wall of inwardly facing angle section;
inwardly converging inner cross walls extending from the inner edges of said side walls and fixedly connected to said steam discharge conduit on opposite sides of the portion thereof having the said discharge orifices therein;
an end wall for the outer end of said second conduit;
an inner end wall for said second conduit and through which said steam discharge conduit projects;
a longitudinal partition for said second conduit extending between said steam discharge conduit and the apex of the second conduit outer cross wall but terminating in spaced relation to the said outer end wall of said second conduit; and inlet and discharge coupling members.

15. A humidifier comprising an elongated steam discharge conduit provided with a plurality of longitudinally spaced discharge orifices on one side thereof;

a second elongated conduit constituting a housing for the major portion of said steam discharge conduit and comprising side walls disposed on opposite sides of and in laterally spaced relation to said steam discharge conduit and of a width substantially exceeding the diameter of said steam discharge conduit;

an outer cross wall;

inwardly converging inner cross walls extending from the inner edges of said side walls and fixedly connected to said steam discharge conduit on opposite sides of the portion thereof having the said discharge orifices therein;

an outer end wall for said second conduit;

an inner end wall for said second conduit and through which said steam discharge conduit projects;

a longitudinal partition for said second conduit extending between said steam discharge conduit and said second conduit outer cross wall but terminating in spaced relation to the said outer end wall;

and inlet and discharge coupling members mounted on said second conduit side walls adjacent the inner ends thereof.

16. A humidifier comprising an elongated steam discharge conduit provided with a plurality of longitudinally spaced discharge orifices in one side thereof;

a second elongated conduit constituting a housing for the major portion of said steam discharge conduit and comprising side walls disposed on opposite sides of and in laterally spaced relation to said steam discharge conduit and of a width substantially exceeding the diameter of said steam discharge conduit;

an outer cross wall;

inwardly converging inner cross walls extending from the inner edges of said side walls and fixedly connected to said steam discharge conduit on opposite sides of the portion thereof having the said discharge orifices therein;

an outer end wall for said second conduit;

an inner end wall for said second conduit and through which said steam discharge conduit projects; and a longitudinal partition for said second conduit extending between said first conduit and said second conduit outer cross wall but terminating in spaced relation to the said outer end wall.

17. A humidifier comprising an elongated steam discharge conduit having a plurality of aligned spaced discharge orifices in one side thereof;

an elongated second conduit embracing said steam discharge conduit except for a relatively narrow segment thereof having the discharge orifices therein;

there being a longitudinal partition extending between said steam discharge conduit and a wall of said second conduit and coacting with said steam discharge conduit and said second conduit to provide passages on opposite sides of and in embracing relation to the major portion of said steam discharge conduit;

said second conduit including outwardly diverging walls fixedly connected to said steam discharge conduit on opposite sides of the portion thereof having said discharge orifices therein;

said walls constituting spreaders for steam discharged from said orifices.

References Cited

UNITED STATES PATENTS

| 2,173,362 | 9/1939 | Gunderson et al. | 137—191 |
| 2,569,512 | 10/1951 | Bottum | 126—113 |

FOREIGN PATENTS 1,030,371  5/1958  Germany.

M. HENSON WOOD, JR., *Primary Examiner.*

H. NATTER, *Assistant Examiner.*